US005558744A

United States Patent [19]
Rock et al.

[11] Patent Number: 5,558,744
[45] Date of Patent: Sep. 24, 1996

[54] TAPE APPLICATION APPARATUS

[75] Inventors: Reinhold Rock, Westlake; Josef Schuessler, Brecksville, both of Ohio

[73] Assignee: Herd Manufacturing, Inc., Cleveland, Ohio

[21] Appl. No.: 351,692

[22] Filed: Dec. 8, 1994

[51] Int. Cl.$^6$ .................................................. B32B 31/18
[52] U.S. Cl. ........................ 156/522; 156/267; 156/269; 156/516; 156/270; 156/530; 156/580; 83/206; 83/282; 83/277
[58] Field of Search ............................... 156/267, 269, 156/516, 255, 522, 270, 530, 510, 580, 581; 83/206, 282, 277

[56] References Cited

U.S. PATENT DOCUMENTS

| | | | |
|---|---|---|---|
| 3,753,837 | 8/1973 | Lense | 156/522 X |
| 4,151,037 | 4/1979 | Klingelhoefer et al. | 156/522 X |
| 4,540,459 | 9/1985 | Stewart et al. | 156/518 X |
| 4,985,105 | 1/1991 | Masuda | 156/530 X |
| 5,055,155 | 10/1991 | Crotty et al. | 156/256 |
| 5,266,150 | 11/1993 | Miller | 156/581 X |

FOREIGN PATENT DOCUMENTS

310814  8/1971  U.S.S.R. ..................... 156/522

Primary Examiner—David A. Simmons
Assistant Examiner—Steven J. Helmer
Attorney, Agent, or Firm—Tarolli, Sundheim, Covell, Tummino & Szabo

[57] ABSTRACT

An apparatus (10) applies adhesive tape to workpieces. A nest plate (52) receives a workpiece (20). A clamp plate (53) holds the workpiece (20) relative to said nest plate (52). A stage (73) holds a leading portion of a continuous tape (12). A first mover (58) moves the nest plate (52) and the workpiece (20) relative to the stage (73) and the tape (12) to engage the workpiece (20) with the leading portion of the tape (12) and affix the leading portion of the tape (12) to the workpiece (20). A second mover (45) moves said nest plate (52), the workpiece (20) and the affixed portion of the tape (12) relative to the stage (73). A sever mechanism (62) severs the affixed portion of the tape from a remaining portion of the tape (12). The clamp plate (52) releases the workpiece (20). A third mover (87) moves the workpiece (20) and the affixed portion of the tape (12) relative to said nest plate (52) to remove the workpiece (20) from said nest plate (52).

16 Claims, 7 Drawing Sheets

TAPE APPLICATION APPARATUS

BACKGROUND OF THE INVENTION

The present invention relates to an apparatus for applying adhesive tape to workpieces. In particular, the present invention relates to an apparatus and method for applying a strip of the tape to an end portion of a workpiece and for cutting the tape which is attached to the workpiece.

A typical workpiece is a body side molding strip for a vehicle. The molding strip is elongate and is made of resilient material, such as rubber. The molding has a flat, back side on which double-side adhesive tape is attached during a preparation step. The molding is mounted on the vehicle by removing a protective backing to expose a surface of the tape and pressing the tape and the attached molding against the vehicle.

The molding has an end portion which is rounded. In order to ensure sufficient adhesive strength at the rounded end portion of the molding, adhesive tape should extend across the rounded end portion. Also, in order to ensure a finished appearance on the vehicle, the adhesive tape must not extend beyond the molding. The molding strip, with the attached adhesive tape, should be prepared in a quick and efficient manner.

SUMMARY OF THE INVENTION

The present invention provides an apparatus and method for applying adhesive tape to workpieces. The apparatus includes nest means for receiving a workpiece. A clamp means holds the workpieces relative to the nest means. A stage means holds a leading portion of a continuous tape.

A first mover means of the apparatus moves the nest means and the workpiece relative to the stage means and the tape to engage the workpiece with the leading portion of the tape and affix the leading portion of the tape to the workpiece. A second mover means moves the nest means, the workpiece and the affixed portion of the tape relative to the stage means. A sever means severs the affixed portion of the tape from a remaining portion of the tape. A means releases the clamp means. A third mover means moves the workpiece and the affixed portion of the tape relative to said nest means to remove the workpiece from said nest means.

The method includes placing the workpiece into the nest means. The workpiece is clamped to hold the workpiece relative to the nest means. The nest means and the workpiece are moved relative to the stage means to affix the leading portion of the tape onto the workpiece. The nest means, the workpiece and the affixed portion of the tape are moved relative to the stage means. The affixed portion of the tape is severed from the remaining portion of the tape. The workpiece is released from the clamp means. The workpiece and the affixed portion of the tape are moved relative to the nest means to remove the workpiece from the nest means.

In a preferred embodiment, the leading portion of the tape extends only along a portion of the length of the workpiece and is at a center location of the width of the workpiece. Also, in a preferred embodiment, another strip of tape is affixed along the entire length of the workpiece.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENTS OF THE PRESENT INVENTION

Figure 1:
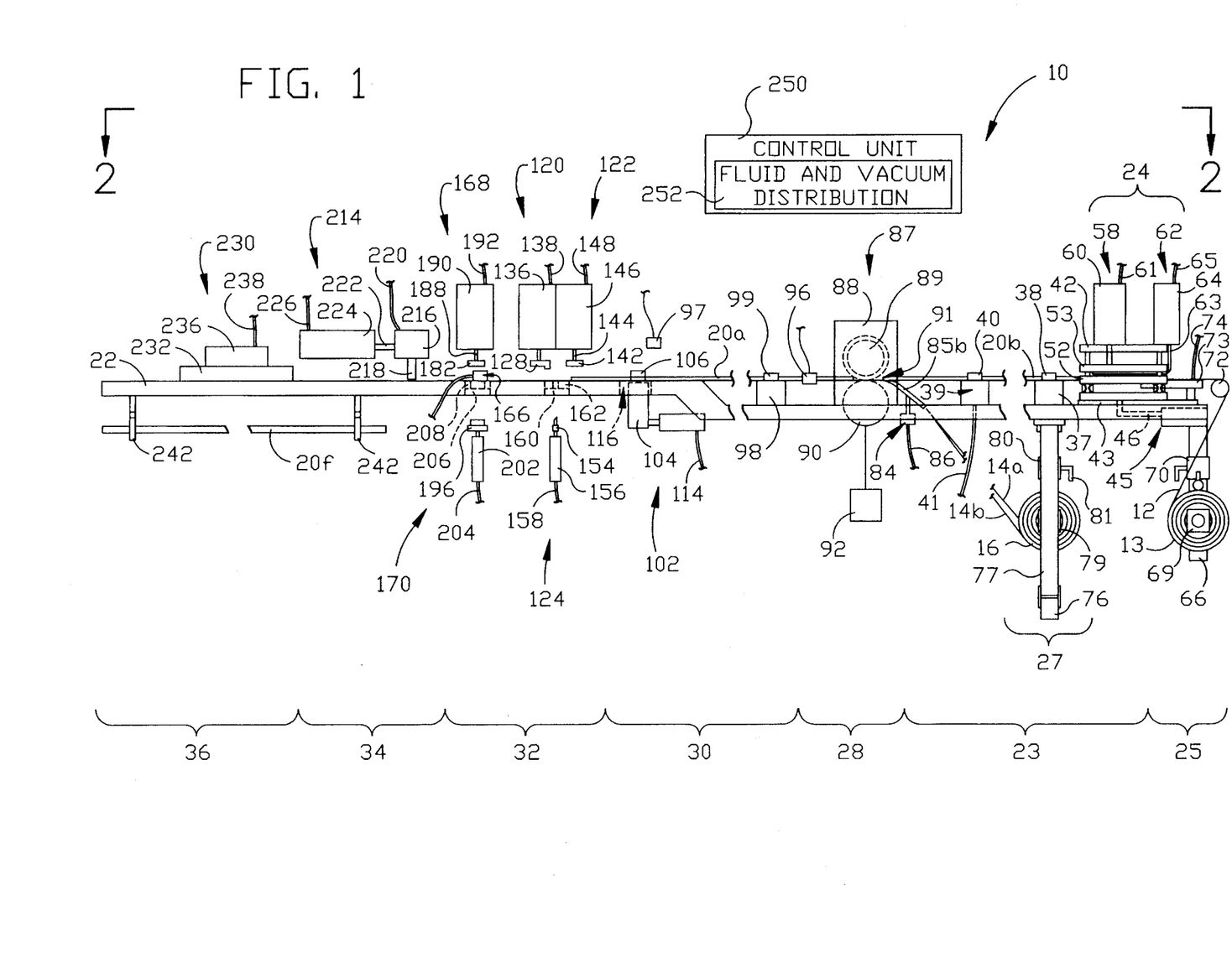
FIG. 1 is a schematic elevational view of an apparatus constructed in accordance with the present invention.
Figure 2:
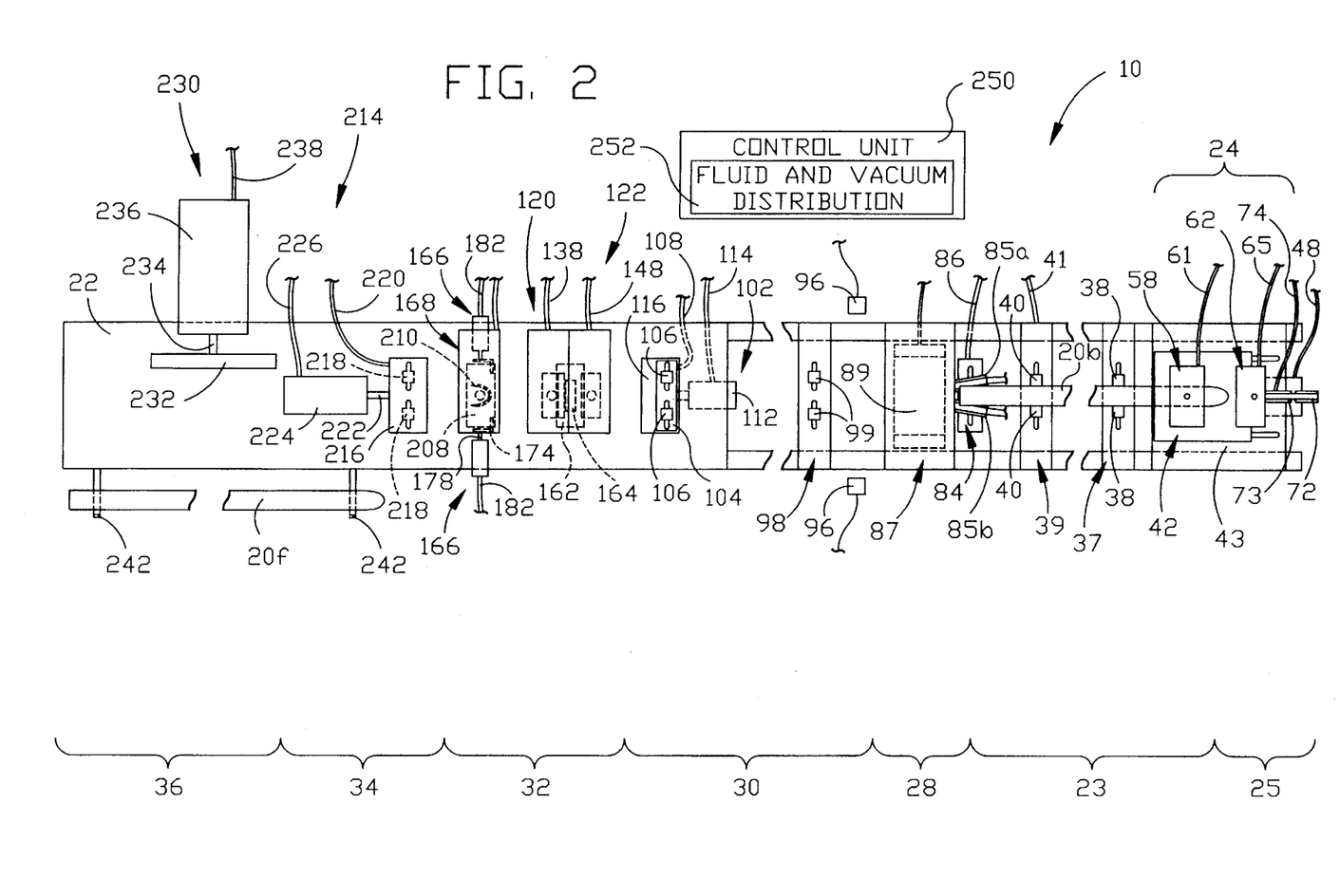
FIG. 2 is a schematic plan view, taken generally along the line 2—2 of FIG. 1, with a workpiece removed for clarity.

An apparatus 10 according to the present invention is shown in FIGS. 1 and 2. The apparatus 10 applies a relatively short center strip of adhesive tape 12 from a storage roll 13 and applies outer strips of adhesive tape 14a and 14b from respective storage rolls 16 (only one shown) to each of several workpieces 20. Hereinafter in the description, the two outer strips of tape 14a and 14b will be referred to by their individual designations (i.e., 14a and 14b) when an individual, tape-specific detail is discussed and will be referred to collectively as the outer strip of tape 14 when an identical tape-collective detail is discussed. The apparatus 10 severs the strips of tape 12 and 14 to fit each workpiece 20. The apparatus 10 also sequentially moves each workpiece 20 to each of several stations after initially being placed onto the apparatus 10.

The use of two outer strips of tape 14a and 14b allows the outer strips of tape to be spaced apart a variable distance and to be adhered to each workpiece 20 adjacent opposite elongate sides of each workpiece 20 regardless of the width of each respective workpiece 20. The center strip of tape 12 provides increased localized adhesion ability upon mounting of the respective workpiece 20. All of the strips of tape 12 and 14 are double-sided adhesive tape with a removable backing on one side to allow handling.

The apparatus 10 (FIG. 1) is designed to process numerous workpieces 20 sequentially. FIG. 1 illustrates leading and trailing workpieces 20a and 20b which are located at different, sequential locations along a flow path (generally right to left, as illustrated in FIGS. 1 and 2) of the apparatus 10. FIG. 1 also illustrated a finished workpiece 20f. The convention terminology of leading and following is used to denote the sequential relationship of two adjacent workpieces 20, with the understanding that each workpiece 20 is trailing relative to the preceding workpiece and leading relative to the subsequent workpiece. Hereinafter, the workpieces 20 will be referred to by their individual designations (i.e., 20a, 20b and 20f) when an individual, workpiece distinctive detail is discussed and will be referred to generically, as the workpiece 20. Each workpiece 20 is elongate with respective ends which are either straight or curved. Each workpiece 20 has a flat, back side onto which the strips of tape 12 and 14 are applied and a contoured outer profile. All of the workpieces 20 of a batch-run are typically identical.

The apparatus 10 (FIG. 1) includes an elongate support track 22, an outer tape supply station 27, a workpiece feed station 23, a center tape processing station 24, a center tape supply station 25, and an outer tape application station 28. The apparatus 10 also includes a transfer station 30, a cutting station 32, a position/removal station 34 and an off-feed station 36.

An operator of the apparatus 10 manually feeds successive workpieces 20 into the apparatus 10 at the workpiece feed station 23. The workpiece feed station 23 includes a workpiece guide 37 fixed on the support track 22. The workpiece guide 37 has movable side bumpers 38 (FIG. 2) which are manually adjustable. The width of the spacing between the movable side bumpers 38, transverse to the extent of the support track 22, is adjustable such that each workpiece 20 is centered on the workpiece guide 37 relative to the support track 22.

The workpiece feed station 23 includes a pneumatic workpiece guide 39 fixed on the support track 22. The workpiece guide 39 includes pneumatically moved side bumpers 40. The side bumpers 40 are biased inward, transverse to the extent of the support track 22 by pneumatic pressure supplied by a fluid line 41 to center each workpiece 20. The operator places each successive workpiece 20 into the workpiece guides 37 and 39 and pushes the workpiece 20 toward the center tape processing station 24 (toward the right in FIGS. 1 and 2) such that an upstream (trailing) end portion of the workpiece 20 enters the center tape processing station 24.

Figure 3:
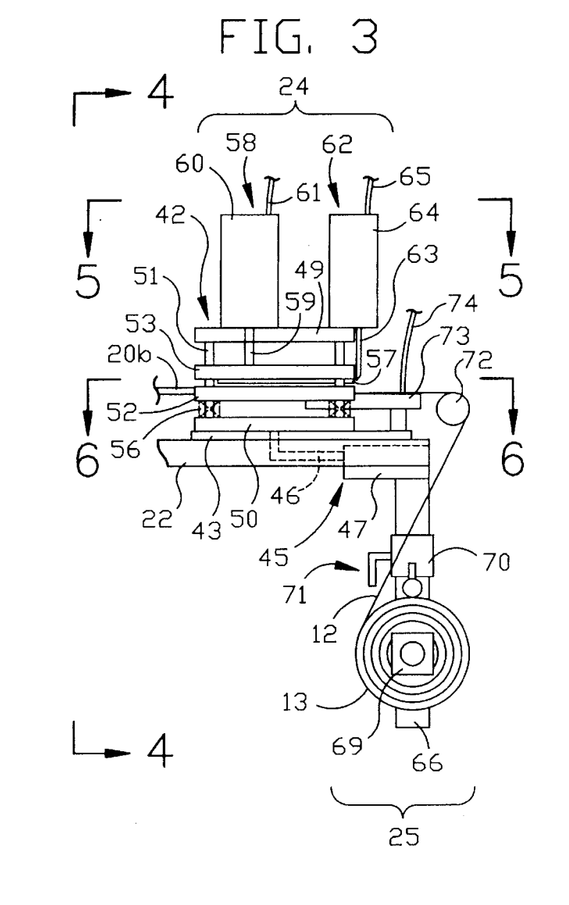
FIG. 3 is a view of center tape supply and processing stations of the apparatus of FIG. 1.
Figure 4:
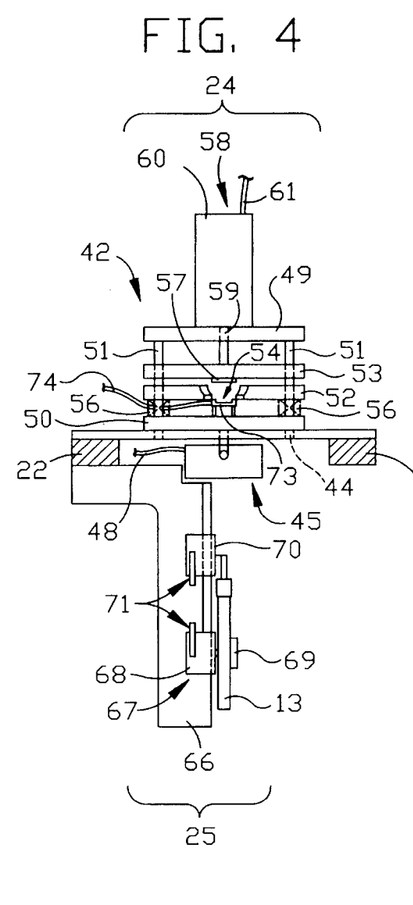
FIG. 4 is a view taken along line 4—4 of FIG. 3 with the workpiece and a leading end of a tape removed for clarity.
Figure 5:
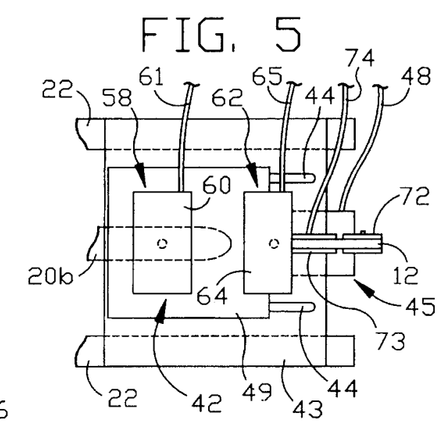
FIG. 5 is a view taken along line 5—5 of FIG. 3.

The center tape processing station 24 affixes the center strip of tape 12 to the workpiece 20, performs a preliminary sever operation on the center strip of tape 12, and advances the workpiece 20 and the affixed center strip of tape 12 downstream for further operational steps. The center tape processing station 24 (FIG. 3) includes a frame 42 which has rectangular upper and lower plates 49 and 50 and four rods 51 vertically extending between the plates 49 and 50 at the four corners. The frame 42 is slidable on a mounting plate 43 which is fixed on the support track 22. The frame 42 is mounted on the plate 43 for sliding movement in directions parallel to the extent of the support track 22 by any suitable means, including bearings and bushings. As representative of this means are guide grooves 44 (FIGS. 4 and 5).

A mover 45 (FIG. 3) moves the frame 42 of the center tape processing station 24 bidirectionally (FIGS. 3 and 7) on the plate 43. The mover 45 (FIG. 3) includes a piston 46 fixed to a bottom of the frame 42 and a cylinder body 47 fixed to the support track 22. The piston 46 is movable bidirectionally along the support track 22 relative to the cylinder body 47 via pneumatic pressure within the cylinder body 47 received from a fluid line 48 (FIG. 4).

Figure 6:
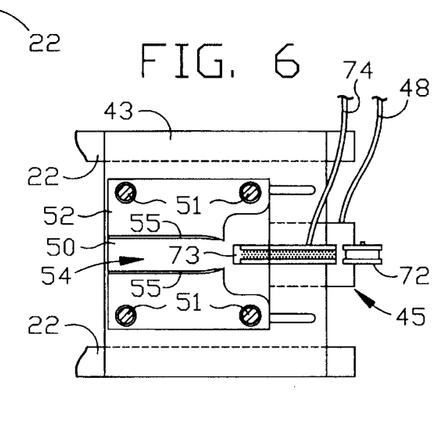
FIG. 6 is view taken along line 6—6 of FIG. 3 with the workpiece and tape removed for clarity.

A nest plate means 52 for receiving and carrying the upstream end portion of the workpiece 20 and a clamp plate means 53 for clamping the workpiece 20 into the nest plate means 52 are slidably mounted on the rods 51 between the upper and lower plates 49 and 50. The nest plate means 52 is comprised of two plate portions which are separated by a nest gap 54 (FIG. 6) which extends between the plate portions in a direction parallel to the support track 22. The plate portions have inner sides which are partially contoured to taper in the general outer shape of the upstream end portion of the workpiece 20 such that the upstream end portion fits between and abuts against the plate portions. Lips 55 extend from lower edges of the plate portions into the nest gap 54 along the contoured segments to support the upstream end portion of the workpiece 20. The nest plate means 52 is movably supported on the lower plate 50 via springs 56 (schematically illustrated in FIGS. 3 and 4) concentric about each rod 51.

Figure 8:
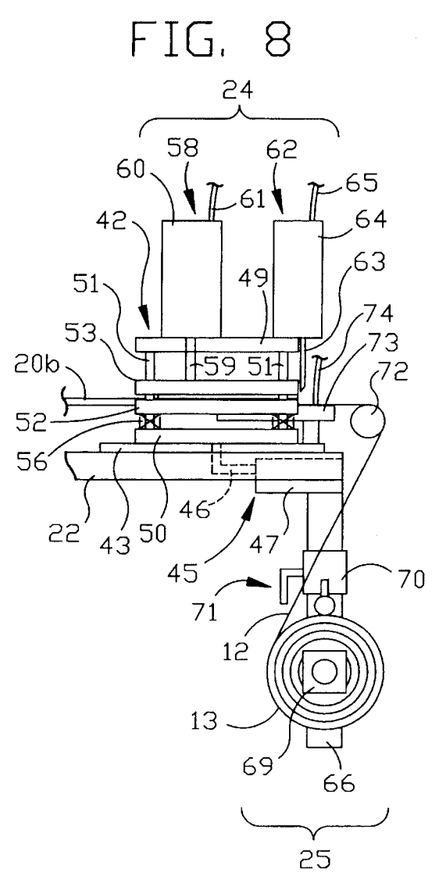

The clamp plate means 53 extends over the nest plate means 52 and is movable downward (FIG. 8) such that a resilient strip 57 of the clamp plate means 53 engages the end portion of the workpiece 20 located in the nest plate means 52 to prevent removal of the workpiece 20. The resilient strip 57 (FIG. 4) is made of a material, such as rubber, to prevent marring the workpiece 20. A mover 58 moves the clamp plate means 53 in the vertical direction along the rods 51 to engage the workpiece 20 and the nest plate means 52. Also, the mover 58 moves the nest plate means 52, the clamp plate means 53 and the end portion of the workpiece 20 against the bias of the springs 56 after the workpiece 20 is clamped. The mover 58 includes a piston 59 connected to the clamp plate means 53 and a cylinder body 60 fixed to the upper plate 49 of the frame 42. The piston 59 is movable relative to the cylinder body 60 under the influence of pneumatic pressure in the cylinder body 60 received from fluid line 61.

A sever mechanism 62 (FIG. 3) of the center tape processing station 24 is mounted on the upper plate 49. The sever mechanism 62 includes a downwardly directed knife edge piston 63 which is movable relative to a cylinder body 64 under the influence of pneumatic pressure within the cylinder body 64 from a fluid line 65. The knife edge piston 63 is movable downward to engage the center strip of tape 12 extending into the center tape processing station 24 for the preliminary sever operation on the center strip of tape 12. In a preferred embodiment, the knife edge piston 63 is sufficiently sharp to sever the center strip of tape 12 and severs the center strip of tape 12 perpendicular to its extent. In addition, the knife edge piston 63 may be heated to a temperature sufficient to melt and sever the center strip of tape 12.

The center strip of tape 12 is supplied to the center tape processing station 24 by the center tape supply station 25 (FIGS. 3 and 4) which is located at a first end portion of the support track 22. The tape supply station 25 includes a fixed arm 66 which extends downward from the support track 22 and on which a hub assembly 67 is located. The hub assembly 67 (FIG. 4) has a fixed bracket 68 and a rotatable hub 69. The roll 13 of the center strip of tape 12 is mounted on the hub 69 to permit rotation of the roll 13 and extension of the tape upwardly.

A slidable weight 70 is located on the arm 66 above the roll 13. The weight 70 rests upon the roll 13 to provide a force for resisting removal of tape from the roll 13. The weight 70 is gravity biased downward so that as the diameter of the roll 13 is reduced by usage, the weight 70 retains a constant pressure on the roll 13 to prevent inertial overrun of the roll 13. In a preferred embodiment, the weight 70 has a roller to engage the roll 13 for reduced friction against the roll 13 during rotation of the roll 13. A sensor mechanism 71, together with suitable circuitry (not shown), provides a signal to the operator when the roll is about to expire. In a preferred embodiment, the sensor mechanism 71 includes two electrical contacts which are adjustably mounted on the bracket 68 and the weight 70.

The center strip of tape 12 extends upwardly (FIG. 3) from the roll 13 to a direction roller 72 rotatably supported (not shown) on the mounting plate 43. The direction roller 72 supports the center strip of tape 12 in a right angle turn to redirect the tape 12 to a tape stage 73. The tape stage 73 is fixed to the mounting plate 43 and has a shallow channel for guiding the center strip of tape 12. The tape stage 73 supports a leading portion of the center strip of tape 12. Also, the tape stage 73 is perforated (FIG. 6) at the channel for creation of a fluid vacuum. A fluid line 74 connected to the tape stage 73 provides for a necessary flow of fluid. The vacuum can be created with either vacuum via the line 74 or a fluid pressure used to create a vacuum via a venturi effect. A vacuum applied to the leading portion of the center strip of tape 12 at the groove holds the leading portion on the stage 73 to prevent falling.

Figure 7:
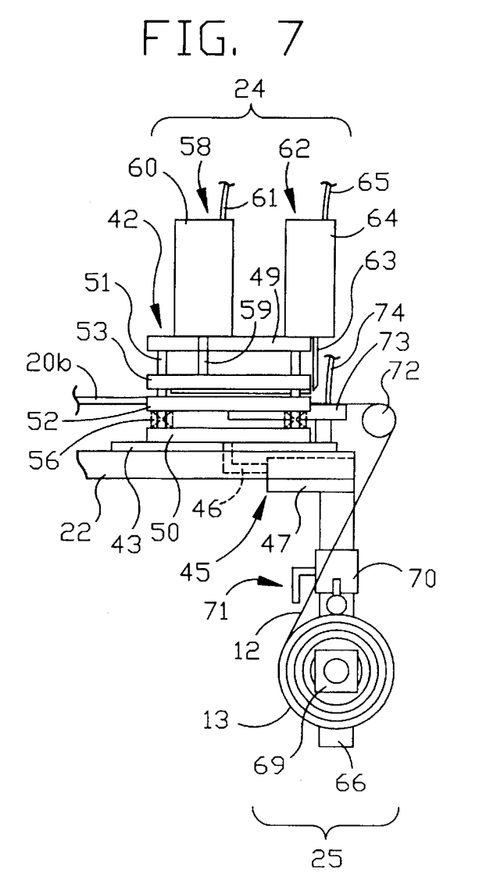
FIGS. 7–10 are views similar to FIG. 3 showing parts in other, sequential, operational positions.

The tape stage 73 (FIGS. 3 and 4) is located intermediate and slightly below the plate portions of the nest plate means 52 of the center tape processing station 25. Moreover, when the center tape processing station 25 is located at its upstream (far right, as shown in FIG. 7) position, the tape stage 73 is located intermediate the contoured segments of the plate portions. Thus, when a workpiece 20 is located in the nest plate means 52 and the center tape processing station 25 is in its upstream position, the upstream end portion of the workpiece 20 is directly above the tape stage 73 and the leading portion of the center strip of tape 12 held by the vacuum. The workpiece 20 is exposed from below through the nest gap 54.

Actuation of the mover 58 (FIG. 8) to move the clamp plate means 53 downward clamps the workpiece 20 into the nest plate means 52, and moves the nest plate means 52 and the end portion of the workpiece 20 downward until the workpiece 20 presses against the leading portion of the center strip of tape 12. The leading portion is thus affixed to the workpiece 20 at a center location of a width of the workpiece 20 and along the relatively short length of the upstream end portion of the workpiece 20. The vacuum at the tape stage 73 can be ceased because the center strip of tape 12 is affixed to the workpiece 20, which is held in the nest plate means 52.

Figure 9:
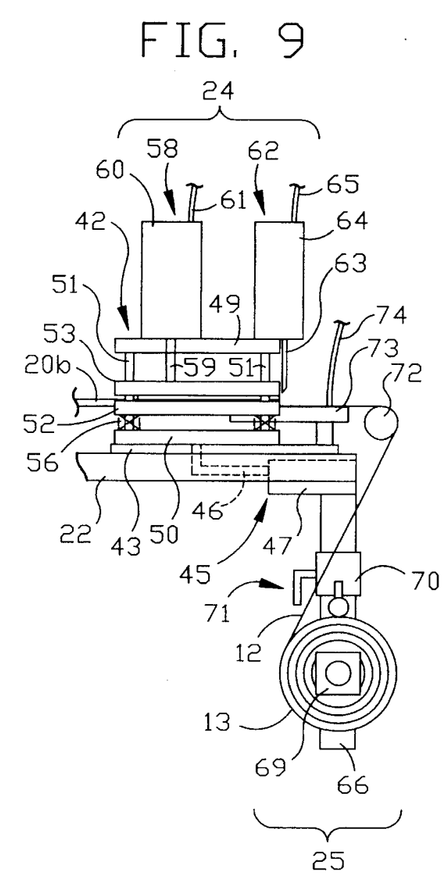

Ceasing the vacuum also permits movement of the center strip of tape 12 across the tape stage 73 without excess drag. Movement of the center strip of tape 12 occurs as the center tape processing station 25 is moved as a unit to its downstream (far left, as shown in FIG. 9) position while the workpiece 20 is clamped in the nest plate means 52. The workpiece 20 is moved to a position relatively away from the tape stage 73 and pulls the center strip of tape 12 across the tape stage 73.

Figure 10:
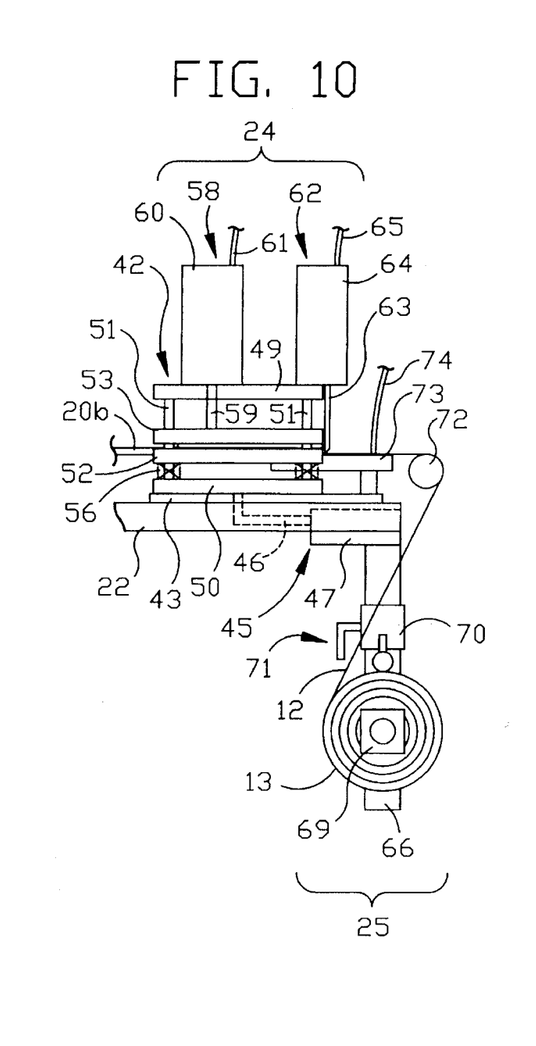
Figure 11:
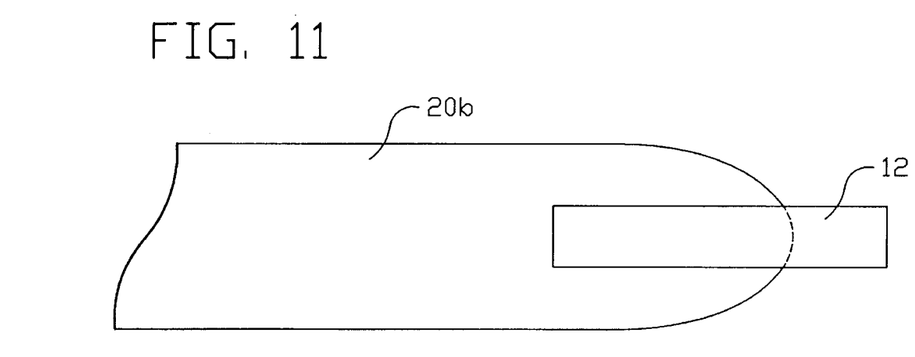
FIG. 11 is a bottom view of a portion of a workpiece during a step in the method of the present invention.

Re-activation of the vacuum at the tape stage 73 re-establishes a force holding the center strip of tape 12. The holding force prevents a remaining portion of the center strip of tape 12 from falling away from the tape stage 73 once the affixed, leading portion is severed from the remaining portion. The leading portion is severed upon actuation of the sever means 62 and downward movement of the knife edge piston 63 (FIG. 10). The affixed portion of the center strip of tape 12 has a tail extending beyond the end of the workpiece 20 (FIG. 11). The clamp plate means 53 is raised (FIG. 3) to release the workpiece 20 from the nest plate means 52. The movement of the workpiece 20 downstream, the severing of the center strip of tape 12, and the release of the workpiece 20 advance the workpiece 20 for further processing at the outer tape application station 28.

The outer strips of tape 14a and 14b (FIG. 1) are supplied to the tape application station 28 by the outer tape supply station 27. The outer tape supply station 27 is located below the support track 22 at the workpiece feed station 23. The outer tape supply station 27 includes a fixed arm (not shown) which extends downwardly from the support track 22. A cross member 76 is fixedly connected to a lower end of the fixed arm and extends perpendicular to the fixed arm. A pivotable arm 77 is pivotably connected at its lower end to the cross member 76. An upper end of the pivotable arm 77 is receivable in a locking bracket (not shown) beneath the support track 22. When the pivotable arm 77 is held in the locking bracket, the fixed arm and the pivotable arm 77 face each other in vertical arrangement.

On each of the arms is a hub assembly 79 attached at a mid-portion of the respective arm. Each hub assembly 79 is similar to the hub assembly 67 (FIG. 4) of the center tape supply station 25, and a respective one of the tape rolls 16 (FIG. 1) is mounted on the respective hub assembly 79 to permit rotation of the respective roll and extension of the tape upwardly, toward the outer tape application station 28.

A slidable weight 80 is located on each respective arm above the hub assembly 79. Each weight 80 rests upon the respective roll 16 to provide a force for resisting removal of the tape from the roll 16. Each weight 80 is gravity biased downwardly so that as the diameter of the respective roll 16 is reduced by usage, the weight 80 retains a constant pressure on the respective roll 16 to prevent inertial over run of the roll 16. A sensor mechanism 81, similar to sensor mechanism 71 (FIG. 4), is associated with each arm to provide a signal to the operator that the respective roll 16 (FIG. 1) is about to expire.

The hub assemblies 79 are located on inner sides of the arms such that they face each other. This entraps the tape rolls 16 between the arms to prevent the tape rolls 16 from falling. To replace the rolls 16, the pivotable arm 77 is released from the locking bracket and pivoted away from the fixed arm, to expose the hub assemblies 79.

Figure 12:
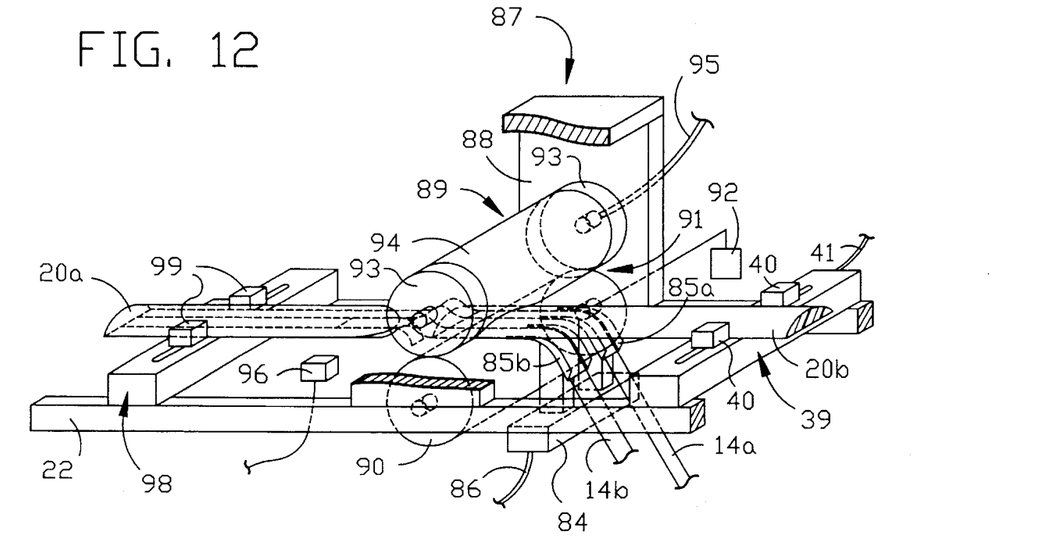
FIG. 12 is an enlarged perspective view of an outer tape application station of the apparatus of FIG. 1 with certain portions broken away for clarity.

The application station 28 (FIG. 12) joins each successive workpiece 20 to the outer strips of tape 14a and 14b. The application station 28 includes a pneumatic tape guide 84 (shown schematically). The tape guide 84 includes two tape ramps 85a and 85b for the outer strips of tape 14a, 14b, respectively. In a preferred embodiment, each of the tape ramps 85a and 85b are hollow and perforated for connection to a fluid pressure source to crate a venturi effect vacuum. The vacuum created at the tape ramps 85a and 85b can hold initial ends of the outer strips of tape 14a and 14b during set up.

The ramps 85a and 85b (FIG. 2) are movable transverse to the extent of the support rack 22 to vary the spacing distance between the outer strips of tape 14a and 14b. The ramps 85a and 85b are biased inward by a pneumatic pressure provided by a fluid line 86. As each successive workpiece 20 moves over the tape guide 84, the ramps 85a and 85b are moved outwardly against the pneumatic pressure to follow an outer side contour of the workpiece 20. Thus, the ramps 85a and 85b align the outer strips of tape 14a and 14b with the outer edges of the workpiece 20 as the workpiece 20 and the outer strips of tape 14a and 14b are moved toward and through a press 87 of the application station 28. The outer strips of tape 14a and 14b are positioned on the workpiece 20 adjacent to the attached center strip of tape 12 in non-overlapping locations. Subsequently described structure of the apparatus 10 operates on the outer strips of tape 14a and 14b simultaneously and thus the collective designation 14 is used herein.

The press 87 (FIG. 12) includes a support frame 88 (partially broken away in FIG. 12), a pneumatic roller 89 and a knurled roller 90. The support frame 88 is fixed on the support track 22 and holds the rollers 89 and 90 such that their rotational axes are perpendicular to the extent of the support track 22. The rollers 89 and 90 define a pressure applying nip 91, through which each successive workpiece 20, with the affixed center strip of tape 12, and the outer strip of tape 14 are moved. Each workpiece 20 and the outer strip of tape 14 are pressed together at the nip 91. A leading end of the workpiece 20 is delivered to the nip 91 by the center tape processing station 24 moving to its downstream position (FIG. 9).

In the preferred embodiment, the roller 90 (FIG. 12) is a solid metal roller which has serrations for providing a gripping surface which rotates to move each successive workpiece 20 and the outer strip of tape 14 through the nip 91. The roller 90 is connected to a drive mechanism 92 (schematically represented) for rotation of the roller 90. Operation of the drive mechanism 92, through the roller 90 provides a force for moving each successive workpiece 20 out of the nest plate means 52 of the center tape processing station 24, and for moving each successive workpiece 20 and the outer strip of tape 14 through the nip 91 and along the support track 22 at the outer tape application station 28. In a preferred embodiment, the drive mechanism 92 is an electrical motor connected to the roller 90 via a drive chain and sprocket.

The roller 89 includes two end pieces 93 and a hollow cylindrical cover 94 which extends between the two end pieces 93. The hollow cover 94 is made of a resilient plastic or rubber which retains a pneumatic pressure within the roller 89. The pneumatic pressure provides a force which resists, and yet permits, deformation of the hollow cover 94. The hollow cover 94, and in particular an outer cylindrical surface of the cover 94, deforms congruently to the outer profile of each successive workpiece 20 as the workpiece 20 moves through the nip 91. The deformation distributes a pressing force across the workpiece 20 to ensure that the outer strip of tape 14 is evenly adhered to each workpiece 20. The pneumatic pressure is supplied by a fluid line 95. In the preferred embodiment, the pneumatic pressure within the roller 89 is approximately 10 psi.

After the center processing station 24 (FIG. 1) pushes each workpiece 20 into the outer tape application station 28, a leading end portion of the workpiece 20 engages the outer strip of tape 14 and enters the nip 91, and the clamp plate means 53 releases the workpiece 20, the drive mechanism 92 is activated. Thereafter, the rollers 89 and 90 move the workpiece 20 from the nest plate means 52 of the workpiece feed station 23 and through the outer tape application station 28. Further, the workpiece 20, with the affixed center strip of tape 12, and the adhered portion of the outer strip of tape 14 and a short following portion of the outer strip of tape 14, are moved into transfer station 30, which is located downstream of the outer tape application station 28.

The transfer station 30 provides a location at which each subsequent trailing workpiece 20b remains while the associated leading workpiece 20a is processed further and until the next subsequent workpiece 20, which is interconnected via the short following portion of the tape extending across a gap between the workpieces, enters the transfer station 30 from the outer tape application station 28. The transfer station 30 includes two sensors 96 and 97 for determining the presence of a workpiece 20 proximate to the respective sensor. Each of the sensors 96 and 97 can be any suitable sensor. In the preferred embodiment, each of the sensors 96 and 97 is a photoelectric "eye".

The sensor 96 is located adjacent to the outer tape application station 28 and detects the trailing end of each successive workpiece 20. Thus, the sensor 96 provides a signal which is indicative of a workpiece 20 moving along the support track 22 away from the outer tape application station 28. The sensor 97 is located above the support track 22 and detects any portion of the workpiece 20 in the transfer station 30. Thus, the sensor 97, together with suitable circuitry, provides a signal which is indicative of a workpiece 20 in the transfer station 30.

The transfer station 30 also includes a workpiece guide 98 which is fixed to the support track 22 and which retains each successive workpiece 20 aligned along the support track 22. The workpiece guide 98 includes movable side bumpers 99 which are manually adjustable. The width of the spacing between the movable side bumpers 99 is adjustable such that each workpiece 20 is centered relative to the support track 22.

Figure 13:
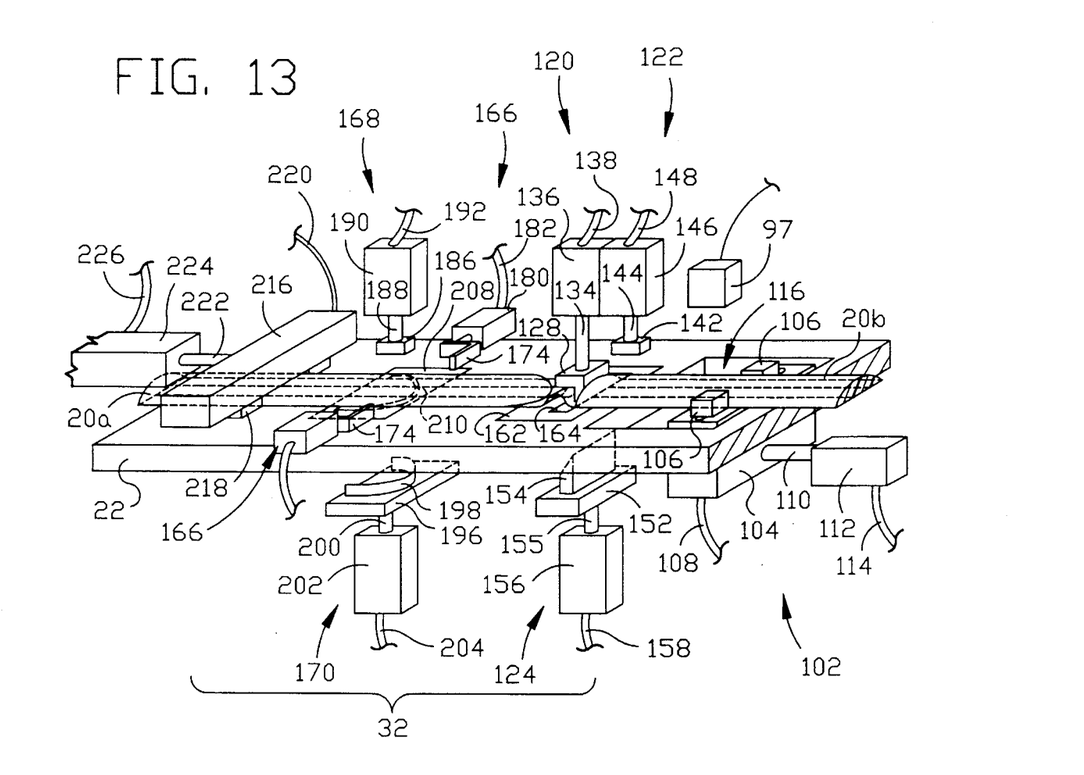
FIG. 13 is an enlarged perspective view of a cutting station of the apparatus of FIG. 1, showing parts in a first operational position.

A gripper/mover assembly 102 (FIGS. 1 and 2) is located at a downstream end of the transfer station 30. The gripper/mover assembly 102 moves each subsequent trailing workpiece 20b (FIG. 13) a relatively short distance towards the cutting station 32 such that the greater part of the trailing workpiece 20b remains in the transfer station 30. The gripper/mover assembly 102 includes a grip head 104 which has grip fingers 106. The grip fingers 106 engage each subsequent trailing workpiece 20b in a pinching manner. The grip fingers 106 are moved inwardly to grip each trailing workpiece 20b under the influence of pneumatic pressure in the grip head 104 provided by a fluid line 108.

The grip head 104 is mounted on a piston 110 which is movable relative to a cylinder body 112 under the influence of a pneumatic pressure. The cylinder body 112 receives the pneumatic pressure from a fluid line 114. The gripper/mover assembly 102 is mounted on the support track 22 such that the cylinder body 112 is fixed below the support track 22 and the grip head 104 extends upward through an aperture 116 on the support track 22. The grip fingers 106 are positioned to engage each subsequent trailing workpiece 20b as it rests upon the support track 22. When the grip fingers 106 engage each workpiece 20, the grip head 104 is moved toward the cutting station 32 to position a leading edge of the trailing workpiece 20b for a first sever operation on the outer strip of tape 14 interconnecting the leading and trailing workpieces 20a and 20b.

The cutting station 32 is located downstream of the transfer station 30. The cutting station 32 (FIG. 1) has a first sever grouping which includes a stop mechanism 120, a hold-down mechanism 122 and a sever mechanism 124. The stop mechanism 120 (FIG. 13) is located above the support track 22 and includes an L-shaped stop head 128 mounted on a piston 134. The piston 134 is movable relative to a cylinder body 136 under the influence of pneumatic pressure in the cylinder body 136 provided by a fluid line 138. The cylinder body 136 is fixed relative to the support track 22 such that movement of the piston 134 moves the head 128 toward or away from the support track 22.

The head 128 is positionable at an up position (FIG. 1) to allow passage of the leading workpiece 20a and is positionable at a down position (FIG. 13) such that a leading edge of the trailing workpiece 20b will abut against an engagement face of the head 128 to stop movement of the trailing workpiece 20b in a position to allow the first sever operation to be performed. The L-shape of the head 128 allows the leg of the L-shape to extend into the gap between the leading and trailing workpieces 20a and 20b sufficiently close to the support track 22 such that the leading edge of a trailing workpiece 20b abuts the engagement face and yet the head 128 does not contact the leading workpiece 20a.

The hold-down mechanism 122 is located above the support track 122 and includes a head 142 for engaging each successive trailing workpiece 20b. The head 142 is mounted on a piston 144. The piston 144 is movable relative to a cylinder body 146 under the influence of a pneumatic pressure in the cylinder body 146 provided by a fluid line 148. Movement of the piston 144 relative to the cylinder body 146 moves the head 142 toward or away from the support track 22. When the head 42 is located in an up position, the leading workpiece 20a is free to pass. When the head 42 is moved to a down position and engages the trailing workpiece 20b, the trailing workpiece 20b is held in a position such that the first sever operation can take place.

The sever mechanism 124 is located below the support track 22 and includes a head 152 upon which a knife edge 154 is mounted. The knife edge 154 is configured in a shape to provide a desired cutting pattern. In the preferred embodiment, the knife edge 154 has a shape which is congruent to the shape of the leading edge of the workpiece 20. In the preferred embodiment, the knife edge 154 is sufficiently sharp to sever the outer tape 14. In addition, or alternatively, the knife edge 54 is heated to a temperature sufficient to melt and sever the outer strip of tape 14.

The head 152 is mounted on a piston 155 which is movable relative to a cylinder body 156. The cylinder body 156 is fixed relative to the support track 22 and receives a pneumatic pressure from a fluid line 158. The pneumatic pressure in the cylinder body 156 moves the head 152 along a direction, perpendicular to the extent of the support track 22, into or out of an aperture 160 (FIG. 1) in the support track 22.

Figure 14:
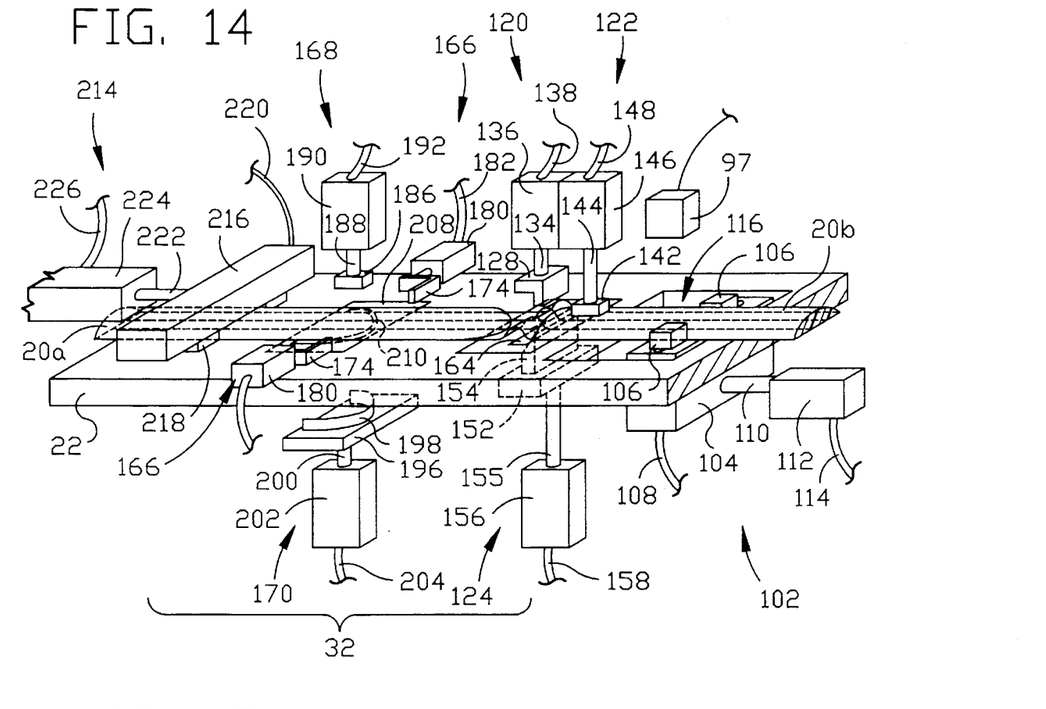
FIGS. 14 and 15 are views similar to FIG. 13 showing parts in other operational positions.

A plate 162 is mounted in the aperture 160. The plate 162 has a slot 164 (FIG. 13) which is congruent to the shape of the knife edge 154 to allow the knife edge 154 to pass through the slot 164. The knife edge 154 is moved (FIG. 14) to extend through the slot 164 to engage and sever the outer strip tape 14.

The first sever operation separates the segment of the outer strip of tape 14 (shown in phantom) adhered to the leading workpiece 20a and the short following portion from the remainder of the outer strip of tape 14 (shown in phantom) adhered to the following workpiece 20b. After the first sever operation, the leading workpiece 20a is free to be moved for further processing.

The cutting station 32 has a second sever group which includes two stop mechanisms 166, a hold down mechanism 168, and a sever mechanism 170. The stop mechanisms 166 are located on left and right sides, respectively, of the support track 22. Each of the stop mechanism 166 has similar structure and operates similarly. Thus, only one of the stop mechanisms 166 is described.

Figure 15:
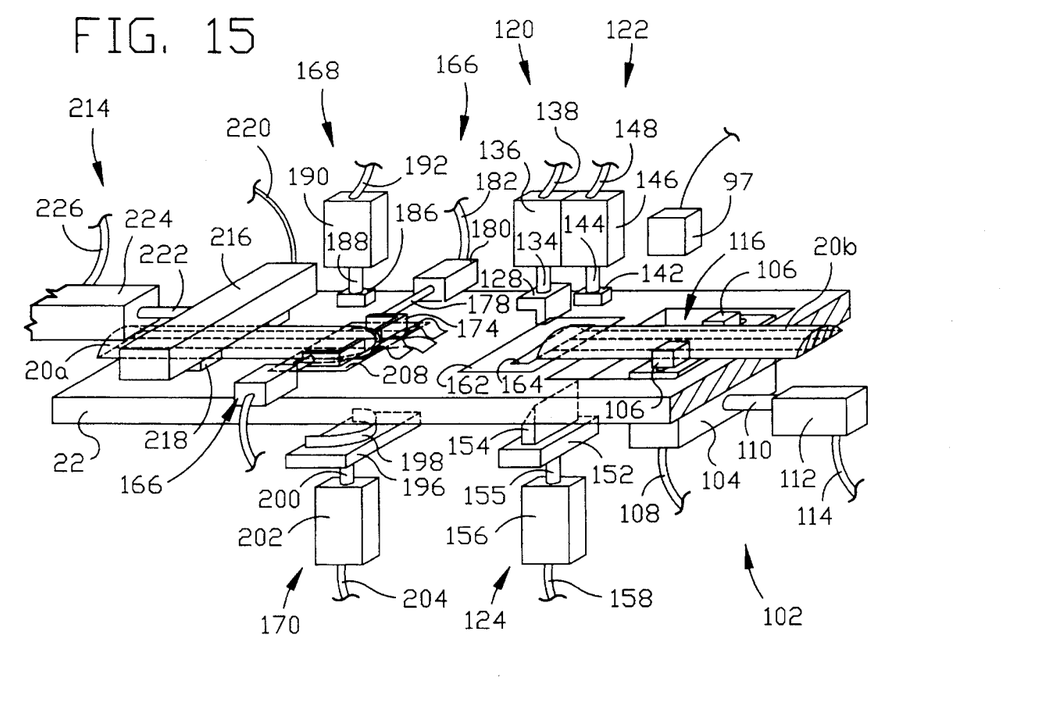

The stop mechanism 166 includes an L-shaped head 174. The head 174 is mounted on a piston 178 which is movable relative to a cylinder body 180. The cylinder body 180 is fixed relative to the support track 22. The piston 178 is movable relative to the cylinder body 180 under the influence of pneumatic pressure provided to the cylinder body 180 by a fluid line 182. The fluid pressure in the cylinder body 180 moves the piston 178 and the head 174 into (FIG. 15) or out of (FIG. 2) the stream of workpieces 20 along a direction which is perpendicular to the stream of workpieces 20.

When the head 174 is located in the path of the stream of workpieces 20 (FIG. 15), the upstream or trailing end of the leading workpiece 20a which is moved upstream relative to the support track 22 can abut against the leg of the L-shape. Abutment of the trailing end of the leading workpiece 20a against the head 174 locates the leading workpiece 20a in a position such that the second sever operation can be performed.

The hold-down mechanism 168 includes a head 186 for engaging each successive leading workpiece 20a. The head 186 is mounted on a piston 188. The piston 188 is movable relative to a cylinder body 190 under the influence of pneumatic pressure in the cylinder body 190 provided by a fluid line 192. The cylinder body 190 is fixed relative to the support track 122 such that the piston 188 and the head 186 are movable toward or away from the support track 22. Upon movement of the head 186 toward a down position the head 186 engages the leading workpiece 20a to hold the leading workpiece 20a at a location such that the second sever operation can take place.

The sever mechanism 170 is located beneath the support track 22. The sever mechanism 170 includes a head 196 upon which a knife edge 198 is mounted. The knife edge 198 has a shape to provide a desired cutting pattern. In the preferred embodiment, the knife edge 198 is shaped congruent to the trailing edge of the workpieces 20. The Figures show the knife edge 198 as having a generally U-shape. In the preferred embodiment, the knife edge 198 is sufficiently sharp to sever the tape. In addition, or alternatively, the knife edge 198 may be heated to a temperature sufficient to melt and sever the tape.

The head 196 is mounted on a piston 200 which is movable relative to a cylinder body 202 under the influence of pneumatic pressure provided by a fluid line 204. The cylinder body 202 is fixed relative to the support track 22 such that the piston 200 and the head 196 is movable relative to the support track 22 along a direction perpendicular to the flow of workpieces 20.

Figure 16:
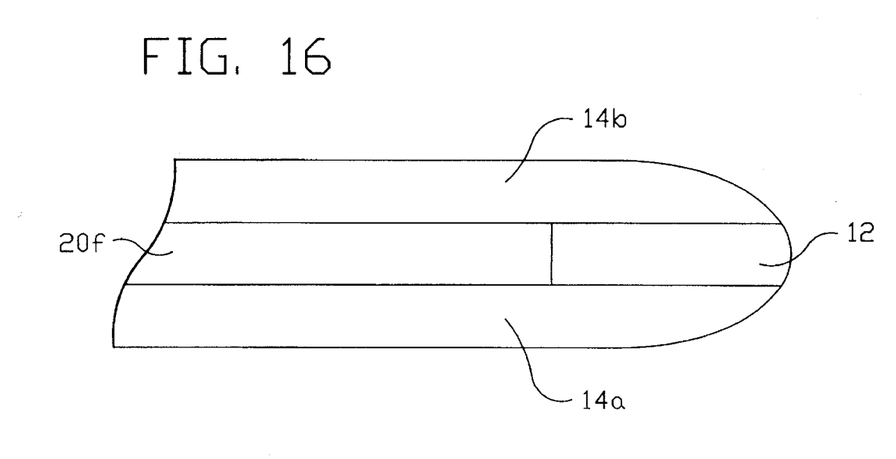
FIG. 16 is a view similar to FIG. 11 during another step in the method of the present invention.

The head 196 (FIG. 1) is movable into an aperture 206 on the support track 22. A plate 208 is mounted in the aperture 206. The plate 208 has a slot 210 (FIG. 2) which is shaped in a manner congruent to the shape of the knife edge 198. The knife edge 198 is movable through the slot 210 to engage and sever both the outer tape and center tape adjacent to the trailing end of the leading workpiece 20a (FIG. 16). The second sever operation separates the segments of tape adhered to the leading workpiece 20a from the short following portions of tape.

The position/removal station 34 (FIG. 1) includes a gripper/mover assembly 214. The gripper/mover assembly 214 is located above the support track 22 and includes a grip head 216. The grip head 216 has grip fingers 218 which extend toward the support track 22 and are located on respective left and right sides of the stream of workpieces 20. The grip fingers 218 are movable inwardly to grip each successive leading workpiece 20a under the influence of pneumatic pressure in the grip head 216 provided by a fluid line 220.

The grip head 216 is mounted on a piston 222 which is movable relative to a cylinder body 224. The cylinder body 224 is fixed relative to the support track 22. The piston 222 is movable relative to the cylinder body 224 under the influence of pneumatic pressure in the cylinder body 224 provided by a fluid line 226. The pressure in the cylinder body 224 moves the piston 222 and the grip head 216 along a direction parallel to the extent of the support track 22. Upon gripping the leading workpiece 20a by the grip fingers 218, the piston 222 and the grip head 216 are moved upstream or downstream relative to the support track 22 to move the respective workpiece 20 upstream or downstream.

The gripper/mover assembly 214 can move the leading workpiece 20a downstream away from the first sever group or upstream toward the L-shaped heads 174 of the stop mechanisms 166 in the second sever group. In addition, the gripper/mover assembly 114 can move the leading workpiece 20a downstream, away from the cutting station 32 and toward the off-feed station 36. Moreover, the grip of the grip fingers 218 can be released to allow movement of the grip head 216 relative to the leading workpiece 20a for repositioning in a compound stroke movement.

The off-feed station 36 includes a push-off mechanism 230 (FIGS. 1 and 2). The push-off mechanism 230 is mounted on top of the support track 22 at one side (FIG. 2). The push-off mechanism 230 includes a head 232 mounted on a piston 234. The piston 234 is movable relative to a cylinder body 236. The cylinder body 236 is fixed relative to the support track 22 and receives a pneumatic pressure via a fluid line 238. The pneumatic pressure within the cylinder body 236 moves the piston 234 and the head 232 across the support track 22 in a direction perpendicular to the flow of workpieces 20. The movement of the head 232 across the support track 232 pushes each subsequent leading workpiece 20a across and off of the support track 22. The workpiece 20, which is now designated as a finished workpiece 20f, is received in collection arms 242 which are mounted on the support track 22. Subsequent finished workpieces 20f are collected in the collection arms 242 for further processing or packaging by an operator.

The control of the various functions of the apparatus 10 (FIGS. 1 and 2), including the various pneumatic pressures and for each of the pressurized fluid controlled devices, is provided by a control unit 250 (schematically represented). The control unit 250 includes a fluid and vacuum distribution network 252, a fluid pressurization source (not shown) and a central processing and logic unit (not shown).

Operation of the apparatus 10 will now be described for the processing of a single workpiece 20 as the workpiece flows along the apparatus 10 and evolves from a trailing workpiece 20b, to a leading workpiece 20a and finally to a finished workpiece 20f. A leading workpiece 20a (FIG. 1) is located in the transfer station 30 and the center tape processing station 24 is in its upstream (FIG. 7) position. The operator of the apparatus 10 places the trailing workpiece 20b into the workpiece feed station 23 such that the trailing workpiece 20b is aligned by the workpiece guides 56 and 60. The operator pushes the trailing workpiece 20b along the support track 22 into the nest plate means 52 of the center tape processing station 24.

Once the trailing workpiece 20b is in the nest plate means 52, the control unit 250 sequentially controls the apparatus until the process is complete. The mover 58 moves the clamp plate means 53 downward (FIG. 8) to clamp the upstream end portion of the trailing workpiece 20b into the nest plate means 52. Also, the mover 58 moves the nest plate means 52, the clamp plate means 53 and the end portion of the trailing workpiece 20b downward. The end portion of the trailing workpiece 20b engages the leading portion of the center strip of tape 12 which is being held on the tape stage by the vacuum.

The vacuum is released and the mover 45 moves the center tape processing station 24 downstream (FIG. 9) as a unit. The trailing workpiece 20b pulls the attached center strip of tape 12 with it and across the tape stage 73. The pulling force from the trailing workpiece 20b pulls an additional length of tape from the roll 13. A new segment of the center strip of tape 12 is positioned on the tape stage 73 and the vacuum is reactivated to hold this new segment.

The sever mechanism 62 is activated to move the knife edge piston 63 downward to sever the affixed portion of the center strip of tape 12 from the remainder of the center strip of tape 12. The segment of the remainder of the center strip of tape which is held on the tape stage 73 by the vacuum becomes the leading end for adhesion to a subsequent workpiece 20. The affixed portion is partially adhered to the trailing workpiece 20b and partially extends beyond the trailing workpiece 20b as the tail. The mover 58 moves the clamp plate means 53 upward to release the trailing workpiece 20b (FIG. 10).

The movement of the trailing workpiece (FIG. 1) 20b downstream causes the leading edge of the trailing workpiece 20b to engage the outer strips of adhesive tape 14a and 14b at the pneumatic tape guide 84 and pushes the leading edge of the trailing workpiece 20b into the nip 91 of the press 87 at the outer tape application 28. As a result, the short following portion of tape which extends from the trailing edge of the leading workpiece 20a is buckled or folded. This provides a short gap between the leading and trailing workpieces 20a and 20b.

After the trailing workpiece 20b is released from the nest plate means 52, the drive mechanism 92 is activated and the rollers 89 and 90 grip trailing workpiece 20b and move it downstream out of the nest plate means 53 and through the nip 91. As the trailing workpiece 20b moves, the outer strips of tape 14a and 14b are pressed against the trailing workpiece 20b. The leading edge of the trailing workpiece 20b pushes against the trailing edge of the leading workpiece 20a. Thus, the trailing workpiece 20b pushes the leading workpiece 20a out of the transfer station 30 and into the cutting station 32. During this movement, the sensor 96 and/or the sensor 97 detect the movement of the leading workpiece 20a out of the transfer station 30. In response to the trailing workpiece 20b leaving the outer tape application station 28 and the leading workpiece 20a entering the cutting station 32, the control unit 250 controls the stop mechanism 120 and the gripper/mover assembly 102. The gripper/mover assembly 102 grips the trailing workpiece 20b and moves the leading edge of the trailing workpiece 20b into engagement with the head 128. The control and fluid distribution mechanism 250 controls the hold-down mechanism 122 and the sever mechanism 124 to sever the outer strip of tape 14 adjacent to the leading edge of the trailing workpiece 20b. The leading workpiece 20a is moved downstream and further processed until the leading workpiece 20a is moved off the support track 22 at the off-feed station 36 as a finished workpiece 20f.

Next, the operator places a subsequent workpiece 20 into the workpiece feed station 23. This will cause a change in designation of the previously identified trailing workpiece 20b to be termed the leading workpiece 20a. After the now trailing workpiece 20b is fed into the center tape processing station 24, the previously described process of affixing and preliminarily severing the center strip of tape 12 is repeated for the now trailing workpiece 20b. As the now trailing workpiece 20b is moved into and through the outer tape application station 28, the now leading workpiece 20a is moved into the cutting station 32 via the now trailing workpiece 20b as previously described. Also, the outer strips of tape 14a and 14b will be severed adjacent to the leading edge of the now trailing workpiece 20b as previously described.

The grip head 216 of the gripper/mover assembly 214 is moved upstream relative to the leading workpiece 20a. The grip fingers 218 grip the leading workpiece 20a and the grip head 216 is moved downstream sufficiently far to move a trailing edge of the leading workpiece 20a downstream of the stop mechanisms 166. If necessary, the gripper/mover assembly may release the leading workpiece 20a and reposition the grip head 216 for a second stroke to ensure sufficient movement of the leading workpiece 20a. Once the trailing edge of the leading workpiece 20a is downstream of the stop mechanism 166, the L-shaped heads 174 are moved into the flow path of the leading workpiece 20a. The gripper/mover assembly 214 then moves the leading workpiece 20a upstream slightly such that the trailing edge of the leading workpiece 20a is moved into engagement with the L-shaped heads 174. The hold-down mechanism 168 and the sever mechanism 170 are actuated to sever the short following portions of the center and outer strips of tape from the sections of tape which are adhered to the leading workpiece 20a.

The gripper/mover assembly 214 again strokes, and if necessary strokes a plurality of times, to move the leading workpiece 20a into the off-feed station 36. The gripper/mover assembly 214 moves the grip head 216 and the grip fingers 218 away from the leading workpiece 20a.

The push-off mechanism 230 strokes to sweep the head 232 across the support track 22 to push the leading workpiece 20a off of the support track 22 and into the collection arms 42. Thus, the leading workpiece 20a is finished and is designated a finished workpiece 20f (FIG. 16). The trailing workpiece 20b which remains in the transfer station 30 is now designated the subsequent leading workpiece 20a and the process cycle is repeated.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for applying adhesive tape to workpieces, said apparatus comprising:

nest means for receiving a workpiece;

clamp means for holding the workpiece relative to said nest means;

stage means for holding a leading portion of a continuous tape;

first mover means for moving said nest means and the workpiece relative to said stage means and the tape to engage the workpiece with the leading portion of the tape and affix the leading portion of the tape to the workpiece;

second mover means for moving said nest means, the workpiece and the affixed portion of the tape relative to said stage means;

sever means for severing the affixed portion of the tape from a remaining portion of the tape;

means for releasing said clamp means;

third mover means for moving the workpiece and the affixed portion of the tape relative to said nest means to remove the workpiece from said nest means, the affixed portion of tape being a first strip of tape; and means for affixing a second strip of tape along an entire length of the workpiece, the second strip of tape being adjacent and non-overlapping the first strip of tape.

2. An apparatus as set forth in claim 1, wherein the first and second strips of tape have tail segments which extend beyond the workpiece, said sever means being a first sever means, said apparatus including a second sever means for severing the first and second strips of tape adjacent to an end of the workpiece to remove the tail segments.

3. An apparatus as set forth in claim 1, wherein the workpiece is a trailing workpiece and said apparatus is arranged to operate on successive workpieces, said third mover means being also for moving a leading workpiece, the leading and trailing workpieces are interconnected by a portion of the second strip of tape.

4. An apparatus for applying adhesive tape to workpieces, said apparatus comprising:

nest means for receiving a workpiece;

clamp means for holding the workpiece relative to said nest means;

stage means for holding a leading portion of a continuous tape;

first mover means for moving said nest means and the workpiece relative to said stage means and the tape to engage the workpiece with the leading portion of the tape and affix the leading portion of the tape to the workpiece;

second mover means for moving said nest means, the workpiece and the affixed portion of the tape relative to said stage means;

sever means for severing the affixed portion of the tape from a remaining portion of the tape;

means for releasing said clamp means;

third mover means for moving the workpiece and the affixed portion of the tape relative to said nest means to remove the workpiece from said nest means; and spring means for resiliently supporting said nest means, said first mover means moving said nest means against a bias of said spring means.

5. An apparatus for applying adhesive tape to workpieces, said apparatus comprising:

nest means for receiving a workpiece;

clamp means for holding the workpiece relative to said nest means;

stage means for holding a leading portion of a continuous tape;

first mover means for moving said nest means and the workpiece relative to said stage means and the tape to engage the workpiece with the leading portion of the tape and affix the leading portion of the tape to the workpiece;

second mover means for moving said nest means, the workpiece and the affixed portion of the tape relative to said stage means;

sever means for severing the affixed portion of the tape from a remaining portion of the tape;

means for releasing said clamp means;

third mover means for moving the workpiece and the affixed portion of the tape relative to said nest means to remove the workpiece from said nest means; and fourth mover means for moving said nest means relative to said stage means to position said nest means to receive a subsequent workpiece; said nest means, said clamp means, said first mover means and said sever means being moved as a unit by said second mover means and said fourth mover means.

6. An apparatus as set forth in claim 5, wherein said second mover means is an actuator operated in a first direction, said fourth mover means is said actuator operated in a second direction.

7. An apparatus for applying adhesive tape to workpieces, said apparatus comprising:

nest means for receiving a workpiece;

clamp means for holding the workpiece relative to said nest means;

stage means for holding a leading portion of a continuous tape;

first mover means for moving said nest means and the workpiece in a first direction relative to said stage means and the tape to engage the workpiece with the leading portion of the tape and affix the leading portion of the tape to the workpiece;

second mover means for moving said nest means, the workpiece and the affixed portion of the tape relative to said stage means in a second direction transverse to the first direction;

sever means for severing the affixed portion of the tape from a remaining portion of the tape;

means for releasing said clamp means; and third mover means for moving the workpiece and the affixed portion of the tape relative to said nest means to remove the workpiece from said nest means.

8. An apparatus as set forth in claim 7, wherein the workpiece is elongate, said stage means being of a size such that the length of the leading portion of tape is less than the length of workpiece.

9. An apparatus as set forth in claim 7, wherein the workpiece has a width and the tape has a width less than the width of the workpiece, said nest means and said stage means being relatively located such that the affixed portion of tape is affixed to the workpiece at a center location of the width of the workpiece.

10. An apparatus as set forth in claim 7, wherein said stage means includes means for applying a vacuum to the leading portion of the tape.

11. An apparatus as set forth in claim 7, wherein said nest means includes two members which engage the workpiece on opposite sides of the workpiece and which are spaced apart for exposing a portion of said workpiece between said members to said stage means and the leading portion of the tape.

12. An apparatus as set forth in claim 11, wherein said two members have lip means for engaging the workpiece, said lip means being located below the workpiece when the workpiece is received by said nest means, said clamp means including an engagement portion for engaging an upper portion of the workpiece.

13. An apparatus as set forth in claim 7, said first mover means including means for moving said nest means and the workpiece in a direction perpendicular to a direction that said second mover means moves said nest means, the workpiece and the affixed portion of the tape.

14. An apparatus as set forth in claim 7, including fourth mover means for moving said nest means relative to said stage means to position said nest means to receive a subsequent workpiece.

15. An apparatus as set forth in claim 14, said fourth mover means including means for moving said nest means to a location such that the subsequent workpiece is above said stage means upon receipt in said nest means.

16. An apparatus as set forth in claim 7, wherein said third mover means also for pulling the tape from a source of the tape across said stage means to position the tape on said stage means such that upon severing of the affixed portion of the tape by said sever means the remaining portion will include a subsequent leading portion on said stage means for a subsequent workpiece.

* * * * *